United States Patent [19]
Brown

[11] Patent Number: 5,711,771
[45] Date of Patent: *Jan. 27, 1998

[54] LATENT HEAT-BALLASTED GASIFIER

[75] Inventor: Robert C. Brown, Ames, Iowa

[73] Assignee: Iowa State University Research Foundation, Inc., Ames, Iowa

[*] Notice: The term of this patent shall not extend beyond the expiration date of Pat. No. 5,516,345.

[21] Appl. No.: 630,109

[22] Filed: Apr. 8, 1996

Related U.S. Application Data

[63] Continuation of Ser. No. 268,636, Jun. 30, 1994, Pat. No. 5,516,345.

[51] Int. Cl.$^6$ .................................................. F28D 20/02
[52] U.S. Cl. .................................. 48/197 R; 48/DIG. 4; 165/104.17; 165/104.21; 422/198
[58] Field of Search .......................... 48/197 R, DIG. 4; 422/198; 165/104.17, 104.21, 902, DIG. 539

[56] References Cited

U.S. PATENT DOCUMENTS

| | | | |
|---|---|---|---|
| 2,606,827 | 8/1952 | Glover | 48/204 |
| 2,619,415 | 11/1952 | Hemminger | 48/202 |
| 2,619,451 | 11/1952 | Ogorzaly et al. | 202/12 |
| 2,846,421 | 8/1958 | Pollock | 260/82 |
| 3,966,634 | 6/1976 | Sacks | 252/373 |
| 4,004,896 | 1/1977 | Soo | 48/202 |
| 4,157,245 | 6/1979 | Mitchell et al. | |
| 4,406,863 | 9/1983 | Jenkins | 165/104.17 |
| 4,421,661 | 12/1983 | Claar et al. | 252/70 |
| 4,443,229 | 4/1984 | Sageman et al. | |
| 4,444,569 | 4/1984 | Haas | |
| 4,446,916 | 5/1984 | Hayes | 165/185 |
| 4,512,388 | 4/1985 | Claar et al. | 165/1 |
| 4,513,053 | 4/1985 | Chen et al. | 428/221 |
| 4,768,345 | 9/1988 | Kardas | 60/641 |
| 4,881,949 | 11/1989 | Brungel et al. | |
| 5,064,444 | 11/1991 | Kubiak et al. | 49/22 |
| 5,145,491 | 9/1992 | Schmitt et al. | 48/197 |

FOREIGN PATENT DOCUMENTS

| | | |
|---|---|---|
| 0072102 | 7/1982 | European Pat. Off. |
| 0383565 | 2/1990 | European Pat. Off. |
| 1285654 | 2/1970 | United Kingdom |

OTHER PUBLICATIONS

"International Journal of Scientists, Engineers and Technologists in Solar Energy and Its Application", *Solar Energy*, 49, No. 3, Pergamon Press, 153–158, (Sept. 1992).

*Primary Examiner*—Timothy McMahon
*Attorney, Agent, or Firm*—Schwegman, Lundberg, Woessner & Kluth, P.A.

[57] ABSTRACT

A latent heat-ballasted gasifier suitable for converting biomass, coal, or low-quality fuels into a producer gas. Latent heat is stored in the reactor in ballasts containing a metal alloy with a melting point approximate the pyrolysis temperatures of the fuel. A fluidized bed reactor is used to enhance heat transfer between the latent heat material and the fuel. The latent heat-ballasts allows the reactor to be operated in a quasi-steady mode rather than a batch operation employed in the prior designs.

19 Claims, 2 Drawing Sheets

LATENT HEAT-BALLASTED GASIFIER

This application is a continuation of U.S. patent application Ser. No. 08/268,636, filed on Jun. 30, 1994 now U.S. Pat. No. 5,516,345.

BACKGROUND OF THE INVENTION

FIELD OF THE INVENTION

The present invention is directed to a method and apparatus for converting biomass, coal, or low-quality fuels into a producer gas, and more particularly, to a latent heat-ballasted gasifier system.

DESCRIPTION OF THE RELATED ART

Considerable progress has been made in the last few years in developing large gasifier/gas turbine power plants that improve energy efficiency and markedly reduce pollution emissions, compared to direct coal combustion. However, these plants cannot be scaled-down to sizes appropriate to many applications without losing the economic advantages realized at the larger scales. The reasons for this become apparent upon examination of the present approaches to gasification.

Gasification consists of two distinct processes—combustion and pyrolysis. Pyrolysis is the chemical decomposition of solid or solid/liquid fuels through the release of volatile compounds at elevated temperatures. Pyrolysis produces combustible components such as CO, $H_2$, $CH_4$, and a variety of condensible organic compounds referred to collectively as tar. Several non-combustible gases are also released, primarily $N_2$, $CO_2$, and water vapor.

Since the overall process of pyrolysis is endothermic, a source of high temperature heat is required to drive the reactions. This heat is generally provided by the second process of gasification: combustion. In particular, a small portion of the solid fuel is burned to provide sufficient heat to pyrolyze the remaining fuel.

One approach combines combustion and pyrolysis in the same reaction vessel. Sufficient oxygen is admitted to burn part of the fuel which then heats surrounding unburned fuel to pyrolysis temperatures. Many gasifier configurations have been developed to accomplish this process, but these methods dilute the product gas with incombustible constituents, degrading the heat value of the producer gas. For example, if air is used as the source of oxygen for combustion, almost four volumes of inert nitrogen will appear in the product gas for every one volume of oxygen required for combustion. Air-blown gasifiers contain as much as 45% nitrogen by volume, resulting in heating values as low as 150 Btu/scf (Btu/cubic feet) compared to 1000 Btu/scf for natural gas. Larger piping, greater pumping penalties, larger power machinery, and/or reduced load capacity are some of the penalties associated with the use of such low heating value fuels.

Nitrogen can be eliminated from the product gas by substituting pure oxygen to burn the fuel. Use of pure oxygen can boost the heating value of the producer gas by 85% to about 280 BTU/scf. However, producer gas from oxygen-blown gasifiers still contains as much as 20% diluent gas in the form of $CO_2$ as a result of combustion. Furthermore, oxygen-blown gasifiers require dedicated air-liquefaction plants to supply the large quantities of oxygen consumed in the process. Such high capital cost facilities are economically justified only for large-scale gasification plants that are well in excess of the capacity appropriate to biomass energy systems.

An alternate approach that avoids use of oxygen in the production of medium BTU gas is known as indirectly heated gasification. In this approach combustion and pyrolysis are physically separated with the result that products of combustion do not appear in the producer gas. Heating values as high as 380 BTU/scf are possible, which is 36% higher than possible with oxygen-blown gasifiers and 230% higher than can be obtained with air-blown gasifiers. Furthermore, no expensive air-liquefaction plant is required to generate this medium Btu gas. Several different schemes of indirect gasification and their shortcomings are described below.

Several alternative schemes for indirect gasification have been suggested. These include transferring hot solids from the combustor to the pyrolyzer, transferring a chemically regenerable heat carrier between these two reactors, transferring heat through a wall common to the reactors, and alternating combustion and pyrolysis in a single reactor. All these methods have proved unsatisfactory as presently practiced.

Transferring hot solids between two reactors is technically feasible but solids handling at temperatures exceeding 1000 K is fraught with many practical difficulties, including high recycle rates to keep the pyrolysis reactor hot and accelerated abrasion and wear at high temperatures. Use of a regenerable chemical reaction that has a high heat of reaction is an attractive concept, but suffers many of the solids handling problems of the hot solids transport approach. Identification of a suitable chemical energy carrier has also hampered further development of this concept. Heat transfer through a separating wall appears to be an obvious and straightforward solution to the problem but requires extraordinary high convection coefficients to move the large quantity of heat at the necessary temperatures. Overall heat transfer rates have been limited by the need to overcome thermal boundary layers on both sides of the separating wall. There is also concern that a gas leak through the wall could lead to an explosion in the pyrolyzer.

Another approach to indirect heated gasification alternates combustion and pyrolysis in a single reactor. This cyclic process begins with combustion of solid fuel in air to release heat that is stored in some high heat capacity material within the reactor. The combustion phase is followed by a pyrolysis phase in which steam is substituted for the air. The fuel is pyrolyzed to producer gas. The heat for this energy absorbing process comes from the heat stored in the reactor during the combustion phase.

Alternating combustion and pyrolysis in a single reactor to produce "water gas," is the only indirectly heated gasification process which has met with commercial success. At the turn of the century, water gas was produced by heating coal in an air stream until it glowed red. At this point, air was shut off and steam injected into the reactor. The endothermic reaction of steam and coal char was supported by the sensible heat capacity of the hot char. The reactor temperature and the rate of gasification quickly dropped as the stored heat was consumed by the endothermic reaction. The cycle was repeated by shutting off the steam and readmitting air. By today's standards, these water-gas reactors are inefficient, polluting, and uneconomical.

SUMMARY OF THE INVENTION

The present invention is directed to a latent heat-ballasted gasifier suitable for converting biomass, coal, or low-quality fuels into a producer gas.

The present invention is also directed to a fluidized bed reactor for efficiently transferring heat from the latent heat-ballasts to the fuel.

The present gasifier is capable of yielding low-cost, medium BTU gas suitable for small-scale power generation or the production of process heat. The present gasifier will also facilitate the use of renewable energy resources and improve the prospects for waste-to-energy facilities in small communities.

Latent heat storage allows the reactor to operate at pyrolysis temperatures for extended periods of time, which yields a more uniform composition in the producer gas. The phase change materials are selected with melting points appropriate to the operating temperatures of the gasifier.

The heat storage occurs in latent heat materials instead of relying on the limited sensible heat capacity of the hot fuel. A fluidized bed reactor is used to enhance heat transfer between the latent heat material and the fuel. Consequently, the reactor is operated in a quasi-steady mode rather than a batch operation employed in the prior designs.

The reactor vessel has a fluidization chamber containing a plurality of ballast housings arranged to permit generally uniform dispersion of a fuel therebetween. However, for some embodiments, non-uniform heat distribution may be desirable.

The fluidization chamber may be lined with a castable ceramic. The ballast housings containing a material with a melting point slightly greater than a gasification temperature. In the preferred embodiment, the ballast housings are stainless steel tubes suspended from the top of the reactor and the material is a metal alloy, such as muntz metal. The muntz metal preferably has a melting point of approximately 1172 degrees Kelvin, 100 K greater than the preferred gasification temperature.

The reactor has an inlet port and a steam source in fluid communication with the bottom of the vessel, and an exhaust port in fluid communication with the top of the vessel. Fuel is introduced into the fluidization chamber through a fuel port proximate the top of the vessel. In the preferred embodiment, an air plenum is provided proximate the bottom of the vessel to fluidize the particulate matter. A distribution plate separating the air plenum from the chamber may be included to achieve generally even distribution of the compressed air. A heat exchanger in fluid communication with the exhaust port is provided for heating water into steam for use in the gasification phase.

During the cold-start phase, a combustion gas is combined with compressed air and burned in the fluidization chamber. Inorganic particulate matter, such as sand or limestone, is provided in the fluidization chamber to facilitate heat transfer to the ballasts.

The method of gasifying fuel includes heating the fluidization chamber to a first predetermined temperature during a cold-start phase. Fuel is then burned in the fluidization chamber during a combustion phase until the fluidization chamber reaches a second predetermined temperature. The second predetermined temperature is above the melting point of the material in the ballasts. The compressed air preferably creates a vigorous bubbling fluidization action during the cold-start and combustion phases.

During the gasification phase, the flow of compressed air is replaced by preferably slightly superheated steam. The latent heat in the ballasts provide heat for converting the fuel by pyrolysis into a gaseous fuel. The temperature of the fluidization chamber is monitored during the gasification phase. The combustion phase is reinitiated when the temperature in the fluidization chamber drops below a predetermined temperature.

In the preferred embodiment, the exhaust port is connected to the atmosphere during the cold-start phase and combustion phase, and is switched to a collection chamber during the gasification phase.

The latent heat released from the solidifying alloy is generally uniformly distributed among the pyrolyzing fuel in the reactor. The preferred fluidized bed reactor provides a generally uniform distribution of the released latent heat. Fluidized bed reactors have the added advantage of being able to process a variety of fuels. The spatially uniform temperature of the preferred reactor assures that tars released during gasification are efficiently cracked into low-molecular weight hydrocarbons. The uniform temperature and high heat transfer rates in the fluidized bed embodiment is also important in transporting heat between the reacting fuel and the thermal ballast. Finally, fluidized bed gasifiers are considered to be more easily scaled to larger sizes than other gasifier designs.

DETAILED DESCRIPTION OF THE PREFERRED EMBODIMENT

Enhanced heat storage in a reactor is essential to a successful cyclic gasifier. However, the sensible heat capacity of fuel is negligible compared to the endothermic chemical energy requirement of pyrolysis. Consequently, pyrolysis temperature rapidly drops unless additional heat capacity is available in the reactor. The sensible heat capacity of reactor walls or liners can provide part of this energy requirement. However, it is generally the case that the latent heat capacity of a material (i.e., heat absorbed or evolved by a unit mass of a substance during a change of state at constant temperature and pressure) is significantly greater than the sensible heat capacity (i.e., heat absorbed or evolved by a substance during a change of temperature that is not accompanied by a change of state) of the same material undergoing modest temperature changes. For example, a nominal maximum temperature for gasification might be 1200 degrees Kelvin (K) with a minimum acceptable temperature of about 1000 K. It would take 3 kg of solid-phase iron undergoing this 200 K temperature change to equal the heat capacity of 1 kg of molten iron undergoing solidification at constant temperature.

Figure 1:
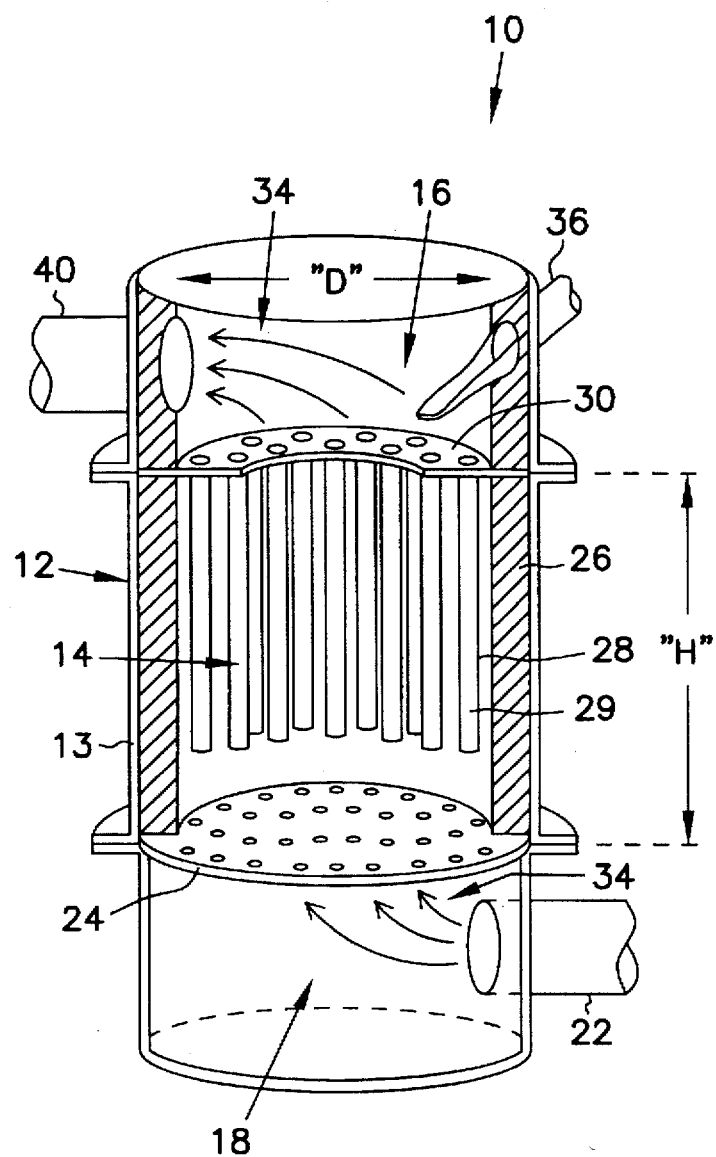
FIG. 1 is a sectional view of the preferred reaction vessel for the present latent heat-ballasted gasifier.

FIG. 1 is a sectional view of the preferred reaction vessel 12 for the present latent heat-ballasted gasifier 10. The vessel 12 generally includes a fluidization chamber 14, a freeboard chamber 16, and a plenum chamber 18. Compressed air from a compressed air source 20 (see FIG. 2) enters the plenum chamber 18 located proximate the bottom of the vessel 12 through an inlet pipe 22. Compressed air 34 is introduced to the fluidization chamber 14 through a distributor 24 separating the plenum 18 from the fluidization chamber 14. It will be understood that a variety of distributor designs are suitable for this purpose, including a drilled plate, bubble caps, and arrays of distributor pipes, which evenly distribute air 34 into the reactor 12.

The inside of the vessel 12 preferably is lined with a few centimeters thickness of castable ceramic 26. The ceramic liner 26 serves to protect the steel vessel walls 13 from corrosion, to thermally insulate the vessel 12, and to provide some sensible heat storage within the vessel 12. Although the vessel 12 preferably is a cylindrical steel structure, it will be understood that a variety of shapes and materials may be used without departing from the scope of the present invention.

An array of stainless steel tubes 28 are mounted from a suspension plate 30 within the vessel 12. These tubes 28 preferably enclose a metal alloy 29 with a melting point approximately 100 K higher than the desired gasification temperature. A copper-zinc alloy (muntz metal), which has a melting point of 1172 K, is suitable for the present latent-heat ballasted gasifier 10. The tubes 28 are welded close to prevent out-gassing of low vapor pressure constituents (e.g., zinc) from the alloy 29 when heated. Otherwise, the zinc content of the alloy 29 would decline, increasing the melting point of the alloy 29 above that required for proper operation of the gasifier. The tubes 28 preferably contain a small quantity of powdered zinc metal, sufficient to give a vapor pressure of zinc equal to the saturation pressure of zinc at the maximum operating temperature of the gasifier 10. This condition also assures that zinc will not outgas from the metal alloy 29 during high temperature operation. The tubes 28 must be able to contain several atmospheres of pressure when heated. Some pressure relief within the tubes 28 is achieved by including an air space within the top of each tube.

It will be understood that the present invention is not limited to tubular ballasts 28. In particular, a variety of shapes with differing surface areas may be utilized to alter the rate of pyrolysis in the reactor 12, such as square or star-shaped tubes. The tubes 28 do not necessarily have to be straight or vertically oriented. The tubes 28 may be configured in a variety of complex shapes to alter the heat distribution within the fluidization chamber 14, such as curves or spirals, and can be arranged in various orientations. Finally, for some applications it may be desirable to provide uneven heat distribution within the fluidization chamber 14, and the tubes 28 can be configured accordingly.

Figure 2:
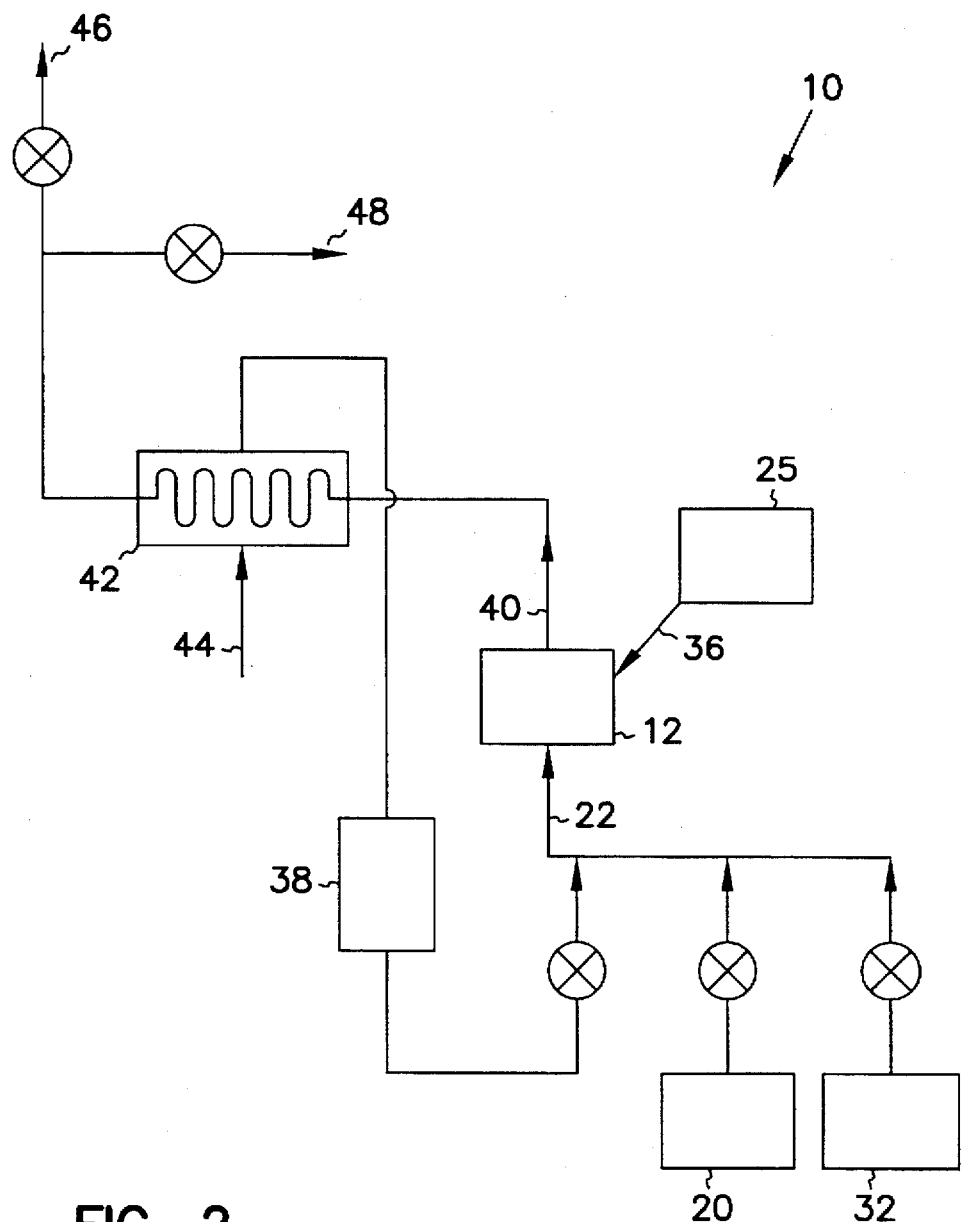
FIG. 2 is a schematic illustration of the preferred latent heat-ballasted gasifying system of the present invention.

The operation of the overall gasifier 10 is illustrated schematically in FIG. 2. The present latent heat ballasted gasifier systems 10 has three primary operational phases: a cold-start phase, a combustion phase, and a pyrolysis or gasification phase. The combustion phase is temporally rather than spatially separated from the pyrolysis phase, as will be discussed below.

During the cold-start phase, the gasifier 10 is brought from cold-start to a nominal operating temperature (typically 900° C.) by burning gaseous fuel from a gaseous fuel source 32 in the air stream 34 flowing through the reactor 12. A variety of methods known in the art may be used for igniting the gaseous fuel. The fluidization chamber 14 of the reaction vessel 12 preferably contains a particulate material, such as sand or limestone particles, to form a fluidized bed reactor. During the cold-start phase, compressed air 34 enters the plenum 18 at the bottom of the reactor 12 at sufficient velocity to fluidize the particulate matter in what is known as the bubbling regime. In this state, heat transfer between the particles and the immersed tubes 28 is extremely high.

Once the reactor 12 is preheated, the gaseous fuel source 32 is shut off and solid or solid/liquid fuel 25 is used to continue heating the reactor 12 during the combustion phase. Fuel 25 is fed steadily into the fluidization chamber 14 through a feedstock chute 36 near the top of the reactor 12 and compressed air 34 is fed into the reactor 12 from the plenum 18. The compressed air 34 gives the fuel 25 the property of a quasi-fluid, such as by suspension of fine fuel particles in a carrying gas. The reactor 12 is heated during the combustion phase to a temperature about 100° C. above the melting point of the alloy 29 sealed in the stainless steel tubes 28.

It will be understood that a variety of fuels may be gasified using the present latent heat-ballasted gasifier system 10, such as biomass, coal, and low-quality fuels such as municipal solid waste. Additionally, fuels with a high liquid content, such as black liquor or coal-water slurries may also be processed in the present system 10.

The cross-sectional area of the reactor 12 is chosen to facilitate a vigorous, bubbling fluidized action while admitting sufficient air to completely burn the fuel 25 within the reactor. The height "H" of the fluidization chamber 14 preferably is twice the diameter "D". However, it will be understood that a variety of reactor configurations may be employed, consistent with good mixing of the fuel in the reactor volume.

The combustion phase is continued until heat transfer between the hot fluidized media in the reactor 12 and the tubes 28 has melted the alloy 29 sealed in the tubes 28. The time required to melt this alloy 29 depends on several factors including the combustion temperature, the size of particles in the fluidized bed, the velocity of gas through the reactor, the amount of thermal insulation at the circumference of the bed, and the total surface area of tubes 28 immersed in the reactor.

Combustion gases created during the cold-start and combustion phases exit the reactor 12 through an exhaust pipe 40 near the top of the reactor 12. These gases are directed through a conventional heat-exchanger 42 (see FIG. 2) to generate steam for the pyrolysis phase discussed below. A water source 44 passes water though the heat exchanger 42 and on to the steam source 38. The combustion gases are exhausted through an exhaust stack 46 to the atmosphere.

At this point, the combustion phase of the cycle is completed and the pyrolysis phase commences. During this transition, the air flow 34 to the reactor 12 is completely shut off and substituted by slightly superheated steam that is slightly above atmospheric pressure from a steam source 38. The flow of fuel 25 to the reactor 12 is also shut off after sufficient fuel 25 for the pyrolysis phase of the cycle has entered the fluidization chamber 14. The amount of fuel 25 to be processed during this phase depends on the reactivity of the fuel 25 and the amount of alloy 29 contained within the tubes 28. The heat to drive this energy absorbing process comes from the solidification of alloy 29 in the tubes 28.

Producer gas, the desired product of this process, also passes through the heat exchanger 42 but is then diverted away from the exhaust stack 46 and to the producer gas exit line 48. Once solidification of the alloy 29 in the tubes 28 is complete and the vessel temperature falls below the level desired for pyrolysis, the combustion phase is once again initiated by switching off the steam source 38 and turning on the compressed air source 20 and the flow of fuel 36 to the reactor 12. Consequently, the reactor 12 operates in a quasi-steady mode, rather than a batch mode.

It is to be understood that the above description is intended to be illustrative, and not restrictive. Many other embodiments will be apparent to those of skill in the art upon reviewing the above description. It should be apparent that the concepts extend to a wide variety of reactor and ballast configurations. The scope of the invention should, therefore, be determined with reference to the appended claims, along with the full scope of equivalents to which such claims are entitled.

What is claimed is:

1. A method for storing heat comprising the steps of:
providing a vessel having a) a fluidization chamber in the vessel, b) a plurality of ballast housings arranged in the fluidization chamber to permit dispersion of heat therebetween, the ballast housings containing a solid material with a melting point at a predetermined temperature, c) a particulate material in the fluidization chamber, and d) an exhaust port in fluid communication with the vessel;

introducing heat into the fluidization chamber; and melting said solid material;

heat energy evolved from the material in the ballasts during a transition from a liquid state to a solid state being capable of providing heat at least into said fluidization chamber.

2. The method of claim 1 where said heat is introduced into the fluidization chamber while said particulate material is fluidized within said fluidization chamber.

3. The method of claim 2 wherein said heat is introduced into the fluidization chamber by burning fuel within said fluidization chamber.

4. The method of claim 2 wherein after heat is introduced into the fluidization chamber, fluidization is ceased.

5. The method of claim 3 wherein after heat is introduced into the fluidization chamber, fluidization is ceased.

6. The method of claim 1 wherein the predetermined temperature comprises about 1172 degrees Kelvin.

7. The method of claim 1 wherein the material contained in the ballast housings has a melting temperature of greater than 1000 degrees Kelvin.

8. The method of claim 1 wherein a gas source is introduced into the fluidization chamber while heat is introduced into said fluidization chamber, and said gas source creating a turbulent bubbling fluidization action.

9. The method of claim 1 wherein the ballast housings comprise stainless steel tubes containing a metal alloy.

10. A method for storing heat comprising the steps of:

arranging a plurality of ballast housings in a fluidization chamber to permit the uniform dispersion of a solid or solid/liquid therebetween;

introducing a particulate material into the fluidization chamber;

introducing a gaseous fuel mixture into the fluidization chamber;

burning said gaseous fuel mixture in the fluidization chamber during a cold-start phase;

creating a fluidized reactor bed;

terminating the burning of the gaseous fuel when the fluidization chamber reaches a first predetermined temperature above a melting point of a substance in the ballast housings;

heat energy evolved from the substance during a transition from a liquid state to a solid state being capable of providing heat energy within said fluidization chamber.

11. A method for storing heat comprising the steps of:

providing a vessel having a) a fluidization chamber in the vessel, b) a plurality of ballast housings arranged in the fluidization chamber to permit dispersion of heat therebetween, the ballast housings containing a solid material with a melting point at a predetermined temperature, and c) a particulate material in the fluidization chamber;

introducing heat into the fluidization chamber; and melting said solid material;

heat energy evolved from the material in the ballasts during a transition from a liquid state to a solid state maintaining a temperature in said fluidization chamber while material in the ballasts move from a liquid to a solid state.

12. The method of claim 11 wherein the predetermined temperature is higher than the temperature being maintained in said fluidization chamber.

13. The method of claim 11 wherein said vessel has an inlet port and an outlet port.

14. The method of claim 12 wherein said vessel has an inlet port and an outlet port.

15. The method of claim 1 wherein said vessel has an inlet port and an outlet port.

16. The method of claim 2 wherein said vessel has an inlet port and an outlet port.

17. The method of claim 3 wherein said vessel has an inlet port and an outlet port.

18. The method of claim 4 wherein said vessel has an inlet port and an outlet port.

19. The method of claim 5 wherein said vessel has an inlet port and an outlet port.

* * * * *